March 8, 1927.
J. L. BETTS
FRUIT PAIL
Filed Oct. 1, 1925
1,620,059
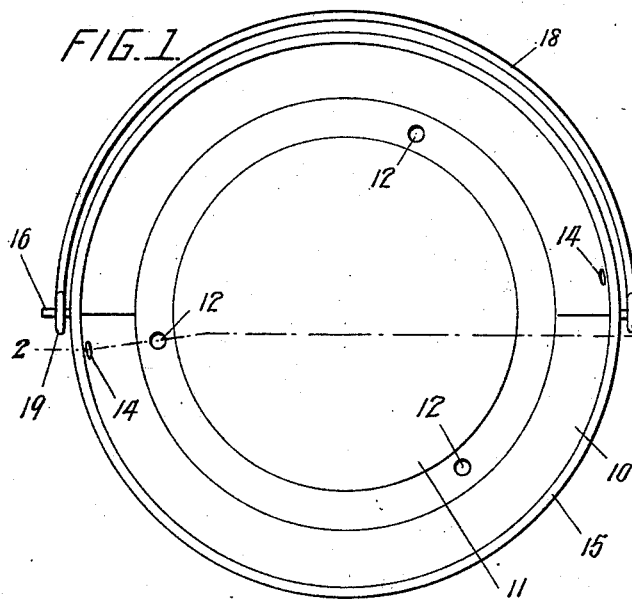
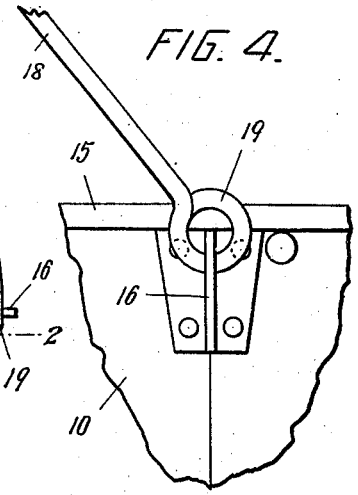
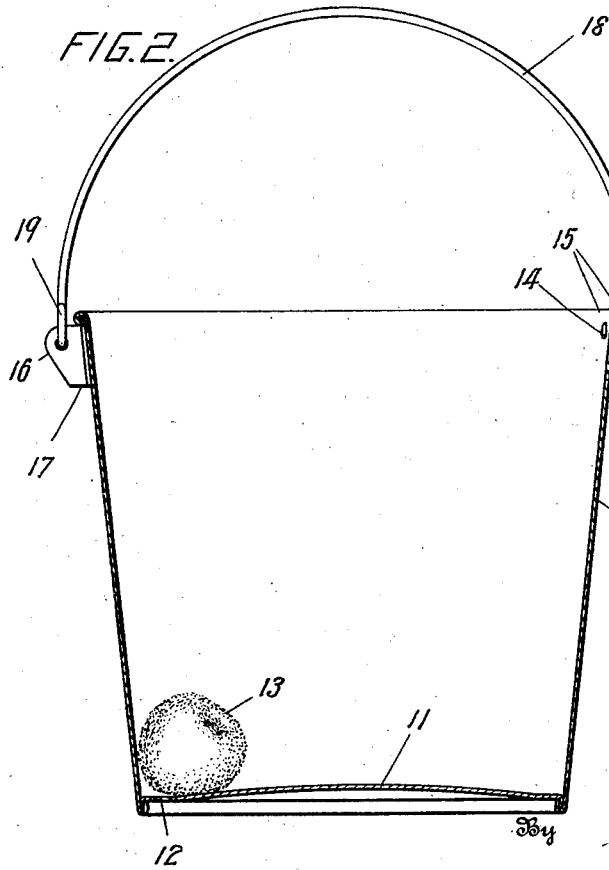
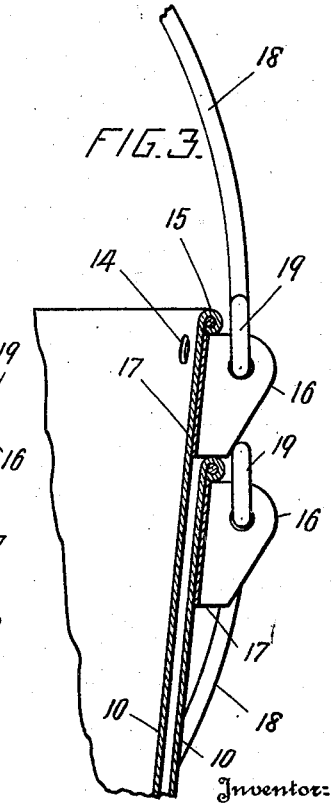
Inventor:
J. L. BETTS Patented Mar. 8, 1927.

1,620,059

UNITED STATES PATENT OFFICE.

JOHN L. BETTS, OF WOODBURY, GEORGIA.

FRUIT PAIL.

Application filed October 1, 1925. Serial No. 59,864.

My invention relates to fruit pails or containers adapted for picking peaches and other similar sized fruits.

One advantage of my pail is its proportions, its width being such that three of my pails will fit in a row across an ordinary wagon box and the height being correct for double decking. Another advantage will be seen in the ears of my device which are so constructed that the pails or buckets will not wedge when nested together. Another advantage is to provide liquid outlets in the bottom so placed as not to mar the surface of the fruit placed in the pails. Another advantage is to provide holes adapted to receive the snaps of the shoulder strap, these holes being placed just under the rolled rim of the bucket. This construction allows the picker to support the pail with the shoulder strap while picking fruit with both hands and when filled raise the pail with the bail and release the snaps of the shoulder strap.

Referring to the drawings:—Fig. 1 is a plan view which clearly shows the bottom drainage holes and the side snap holes also the extending ears. Fig. 2 is an elevation cross-section taken on the line 2—2 of Fig. 1. Fig. 3 is a detailed cross-section of nested pails showing the purpose of the ears. Fig. 4 is a detail of one ear and one snap hole.

Referring more particularly to the drawings:—10 denotes a pail or bucket, 11 a slightly convex bottom, 12 drainage holes placed near the periphery of the bottom and so located that a fruit such as an apple, because of its diameter, will not rest upon the cutting edges of the holes, the fruit resting against the bottom and side of the pail. 13 denotes an apple placed in the pail, 14 denotes the position of two holes placed under the rolled rim 15, for the purpose of attaching the snaps of a shoulder strap, 16 denotes the ears of my pail which are provided with shoulders 17 adapted to rest upon the rim of the pail below when the pails are nested as shown in Fig. 3. 18 is a conventional bucket bail, so secured in the ears as not to prevent the nesting of the pails as described above, 19 denotes the loop of the bail and it will be seen that this loop rests against the ear 16 of the bucket next above as shown in Fig. 3, thus centering said bucket and preventing the soiled outer surface from coming in contact with the clean inner surface of the bucket below.

It will be seen from the foregoing that I provide a pail that will not contain a liquid, this is a great advantage, in that if it becomes necessary to leave a pail filled with fruit in the orchard, rain or dew will drain off and not settle in the bottom of the pail to the detriment of the fruit. It will also be seen that the pail, because of the holes in the bottom, cannot be used for poisonous compounds such as liquids adapted for spraying fruit trees.

Having described my invention, what I claim and desire to secure by Letters-Patent is:—

1. A fruit pail having a bottom devoid of openings except in a peripheral zone in which are located a plurality of openings positioned at points between the side of the pail and the tangent points of the circumferences of the pieces of fruit resting upon the bottom of the pail.

2. A plurality of nested containers, each of which has attached to its upper portion a pair of ears having attached thereto a bail, each ear having an outwardly extending bottom edge portion resting upon the top of the container next below, and an upwardly extending oblique edge portion resting against the bail of the container next below.

In testimony that I claim the foregoing as my own, I affix my signature.

JOHN L. BETTS.